United States Patent [19]
Wentworth

[11] 3,724,085
[45] Apr. 3, 1973

[54] DRAPERY ROD INSTALLATION TEMPLATE

[76] Inventor: Henry C. Wentworth, 948 Pine Street, Muskegon, Mich.

[22] Filed: Feb. 16, 1971

[21] Appl. No.: 115,231

[52] U.S. Cl. ................................33/189, 33/180 R
[51] Int. Cl. ..........................................B25h 7/00
[58] Field of Search.....33/174 R, 174 G, 180 R, 189, 33/197; 408/72

[56] References Cited

UNITED STATES PATENTS

| | | | |
|---|---|---|---|
| 2,990,733 | 7/1961 | Garcia | 33/189 |
| 2,799,093 | 7/1957 | Miller | 33/180 A |
| 3,371,423 | 3/1968 | Paul | 33/174 G |
| 3,246,399 | 4/1966 | Southern | 33/174 G |

*Primary Examiner*—Harry N. Haroian
*Attorney*—Price, Heneveld, Huizenga & Cooper

[57] ABSTRACT

This drapery template includes a flat, elongated rule, having a linear rib projecting rearwardly from the rear face of the rule so that it can be hung on a window casing. There are a plurality of regularly spaced markings along the length of the rule whereby the distance of one end of the rule from the vertical edge of a window casing can be determined. Near the same end of the template, there are a pair of vertically spaced drill guide fixtures extending through the body of the rule. A pair of casement brackets can be slidably mounted on the rule such that it can be used in conjunction with a casement window. A second similar rule, with drill guide fixtures located at the opposite end from the drill guide fixtures of the first rule includes a bracket whereby the two rules can be releasably engaged together in endwise abutment.

12 Claims, 8 Drawing Figures

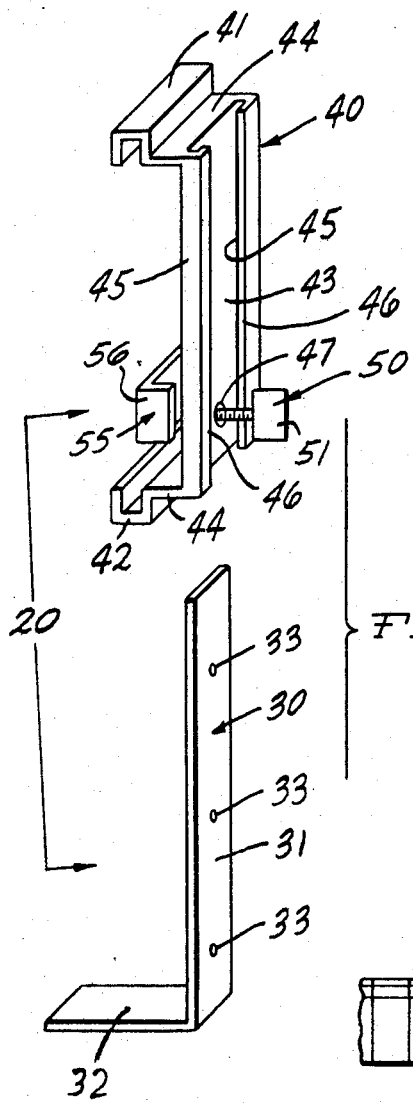
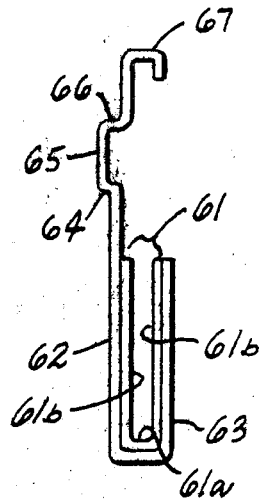
FIG. 4
FIG. 8
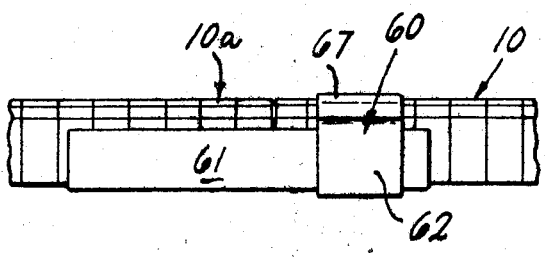
FIG. 6
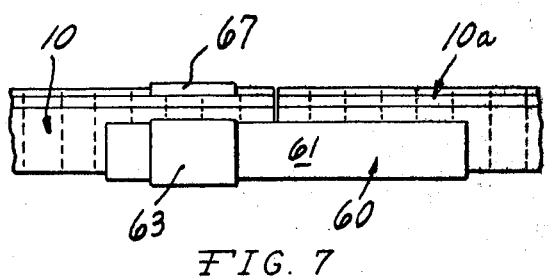
FIG. 7

DRAPERY ROD INSTALLATION TEMPLATE

BACKGROUND OF THE INVENTION

This invention relates to a device for aiding in hanging draperies. More specifically, it relates to a template which facilitates the drilling of the holes into which the drapery traverse rods are secured.

Heretofore, it has been possible to put up drapery traverse rods only by measuring an appropriate distance from the side edge and from the top of the casing of a window, marking the appropriate location, for the screw holes, and then drilling the screw holes. Such work is unnecessarily tedious, and one must be careful when drilling the holes to make sure that they are drilled generally perpendicular to the wall surface.

To the inventor's knowledge, there is no template in general use in the trade to facilitate the location and drilling of such screw holes. The U.S. Pat. to Miller, No. 2,799,093, discloses a gauge for hanging window shades, but it would not be suitable for aiding in the drilling of holes in the wall for traverse rods. This device comprises a pair of telescoping sections having holes at either end thereof. A pair of brackets are provided for hanging the device from the top of the window casing. Proper positioning of the holes in the ends of the gauge is achieved by actually placing a shade in the device.

This device is not suitable for use in installing drapery traverse rods for several reasons. First of all, the device does not have any means for properly determining the location of the screw holes for traverse rods. There is no way to place a traverse rod in the device to thereby gauge the setting. Even if there were, there is no means on the gauge for properly centering it with respect to the window.

Secondly, the brackets provided to hold the gauge of Miller are clumsy, and it would be desirable to avoid using them where possible. Also these brackets are infinitely adjustable, and in varying the position of the guide with respect to these brackets one would either have to use a level on the guide or would have to very carefully measure the position of the guide with respect to the brackets in order to keep the guide horizontal.

Finally, the Miller gauge for hanging window shades does nothing to aid in the drilling of holes which are generally perpendicular to the wall surface. Once the location of the holes is determined using the Miller device, the holes must still be drilled very carefully in order to insure their generally perpendicular nature.

SUMMARY OF THE INVENTION

The present invention is a template specifically designed for use in hanging draperies. It comprises a flat, elongated rule having a linear rib projecting rearwardly from the rear face of the rule in order to facilitate hanging the rule on the top of a window casing. In most instances, this rib eliminates the necessity for cumbersome brackets.

The rule is marked at regular intervals along its length in order that the distance from one end of the rule to the vertical edge of a window casing can readily be determined. At least two, vertically spaced location holes pass through the rule near one end thereof, and these holes are sufficiently large that a drill bit can be inserted through them into a wall. Using the regularly spaced markings, one can move the end of the template, near which the location apertures are located an appropriate distance from the edge of the window casing and can then insert a drill through the location apertures to drill holes in the wall.

In order to facilitate drilling, the location apertures are preferably defined by a drill guide fixture extending through the rule. This fixture is sufficiently deep that it tends to align a drill bit generally perpendicular to the wall into which a screw hole is being drilled.

While in most instances brackets need not be used with the template, specially designed generally L-shaped brackets are provided which can be releasably secured to the rule to adapt it for use in conjunction with casement windows. Most windows which are to be draped have casing upon which the rule can be hung by means of the rearwardly projecting rib. Where draperies are to be hung on casement windows, however, the generally L-shaped brackets can be secured to the rule. Each bracket includes a leg extending downwardly from the rule, and a foot projecting inwardly from the rule for abutment with the inside top of the casement window.

In yet another aspect of the invention, a pair of such rules having location apertures at opposite ends can be held in endwise abutment by means of a bracket which is rigidly secured to one of the rules but which is releasably secured to the other. This arrangement allows one to have two separate relatively short rules for aligning apertures at the right and left ends respectively of larger windows, but allows one to join the rules together for use on smaller windows over which it would not be inconvenient to shift the combined rule to the right and then to the left to locate the right side and then the left side holes respectively.

These and other objects and advantages of the invention will be seen and understood by reference to the specification and appended drawings.

BRIEF DESCRIPTION OF THE DRAWINGS

FIG. 4 is an exploded perspective view of a casement bracket;

FIG. 6 is a front elevation of a pair of rules joined together in endwise abutment;

FIG. 7 is a rear elevation of a pair of rules joined in endwise abutment; and

FIG. 8 is an end view of the bracket used to join a pair of rules together shown without being attached to either rule.

PREFERRED EMBODIMENT

Figure 1:
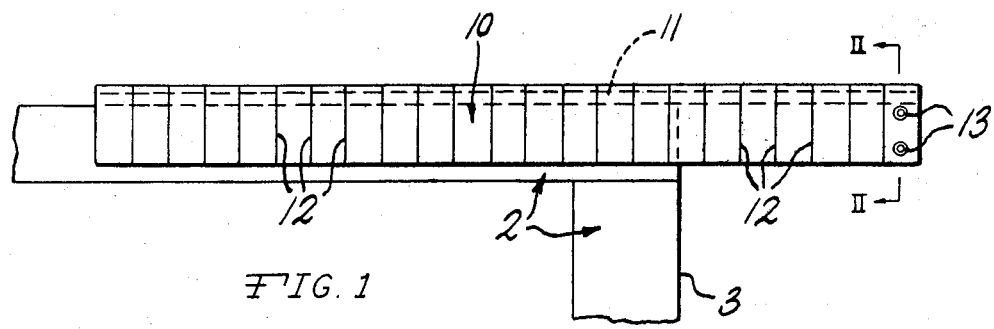
FIG. 1 shows a front elevation of a single rule in use on a conventional window having a casing.
Figure 2:
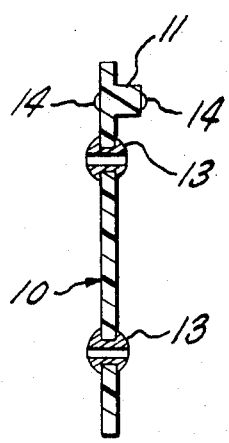
FIG. 2 shows a cross section of the rule taken along plane II—II of FIG. 1.

In the preferred embodiment, the fundamental unit of the template is the rule 10 (FIG. 1) having a rib 11 projecting rearwardly therefrom (FIG. 2). Rib 11 makes it possible to hang rule 10 from the top of the window casing 2 (FIG. 1) and thereby insures proper orientation of rule 10 with respect to the top of the window casing. A pair of vertically spaced location apertures are defined by a pair of drill guide fixtures 13 passing through rule 10 near one end thereof. Since many windows are fairly wide, drill guide fixtures 13 are preferably located only at one end of rule 10. Otherwise, the fixtures at one end would tend to scratch the surface of the casing 2. In the alternative, rule 10 would have to be so long that it would be unwieldy.

Figure 3:
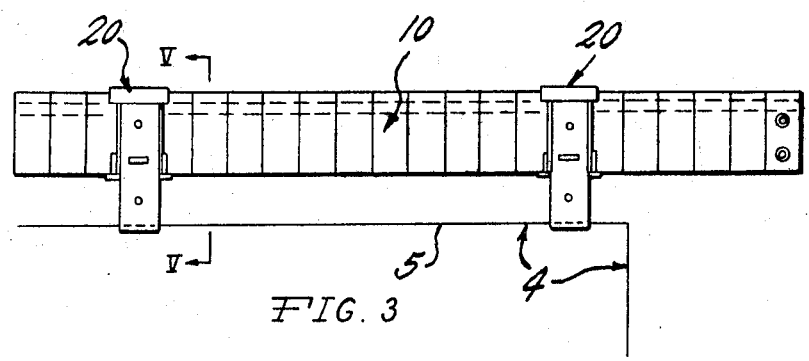
FIG. 3 shows a front elevation of a single rule having casement brackets attached thereto for use on casement windows.

Casement brackets 20 can be attached to rule 10 to facilitate its use on casement window 4, as opposed to windows having casings (FIG. 3). On windows of some sizes, it will be convenient to join two rules such as rule 10 together so that there are drill guide fixtures 13 located at both the right and the left end of the assembly. Thus, a rule 10a includes a joining bracket 60 attached thereto into which rule 10 can be slidably fitted (FIG. 6).

Rule 10 is preferably made of a clear plastic. Because it is clear, one can more readily determine the relationship of the vertical side edge 3 of window casing 2 with respect to a particular marking 12. The marking 12 extends vertically across the front face of rule 10, and is preferably defined by shallow grooves in the face of rule 10. These grooves are etched with a dark ink. They could be etched or printed on a thin transparent sheet of plastic which could be adhered to rule 10. In countries utilizing the English system of measurement, the distance between adjacent marks 12 would be in inches, while in metric countries, the spacing would be in centimeters. An appropriate numeral is placed adjacent each marking 12 in order that the approximate distance of the drill guides 13 from the vertical edge 3 of the window casing 2 can readily be ascertained.

The drill guides 13 extend through the body of rule 10 (FIG. 2) and define apertures of a sufficient diameter that an appropriate drill bit can be inserted therethrough. Each drill guide fixture is sufficiently deep that it tends to hold the drill bit in perpendicular alignment with the wall. The location apertures could merely be holes passing through the body of rule 10, but in order to have desired depth, one would have to increase the thickness of rule 10. In the preferred embodiment, rule 10 can be of a minimum thickness while the depth necessary to guide a drill bit can be achieved through the use of the drill guide fixtures 13.

Figure 5:
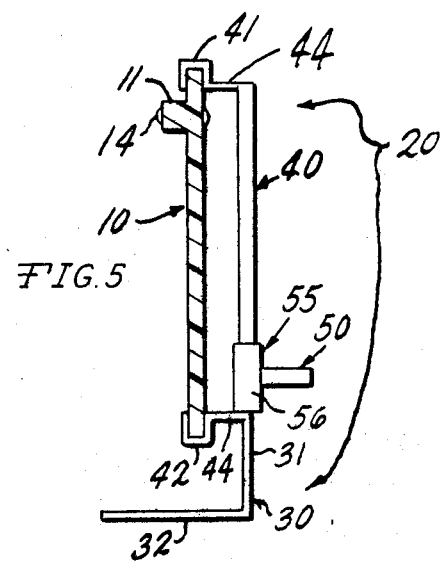
FIG. 5 is a cross section taken along plane V—V of FIG. 3.

Rib 11 is a linear member which runs generally parallel to the top and bottom edges of rule 10 (FIG. 1). It is secured to rule 10 by an appropriate adhesive and/or by rivets 14 (FIGS. 2 and 5). Rivets 14 provide security of attachment. Preferably, rib 11 extends continuously for the length of rule 10. This insures that rule 10 will have a proper orientation with respect to the top of casing 2. The use of two relatively short ribs could result in one of the ribs setting in a low spot in the casing and could thereby result in an improper orientation of the holes which are ultimately drilled into the wall.

Occasionally, a drapery hanger finds himself over casement windows, where no window casing is provided upon which rib 11 could be located. For this purpose, a pair of casement brackets 20 are provided which can be releasably secured to rule 10 (FIG. 3). Actually, each casement bracket 20 comprises two separate components, i.e., a generally L-shaped bracket 30 and a sliding bracket 40 (FIG. 4). L-shaped bracket 30 is made of metal or other suitable material and includes a leg 31 and a foot 32 extending laterally from the base thereof. When casement bracket 20 is secured to a rule 10 (FIG. 5) leg 31 extends downwardly past the bottom of rule 10 and foot 32 extends inwardly from the bottom of leg 31, beneath rule 10, for abutment with the upper inside surface 5 of casement 4.

Sliding bracket 40 comprises a top channel 41 which fits over and embraces the top edge of rule 10 (FIG. 5) and a bottom channel 42 which fits over and embraces the bottom edge of rule 10. It can be slid along the length of rule 10 so that rule 10 can be used on casement windows of varying widths. A vertical panel 43 is joined to and is spaced from top channel 41 and bottom channel 42 by a pair of spacer legs 44, one extending from its top and the other from its bottom (FIGS. 4 & 5). A guide wall 45 extends outwardly from each side edge of panel 43 in a direction opposite that which spacer legs 44 extend (FIG. 4). The guide walls 45 are bent over slightly at a distance spaced from panel 43 to define a lip 46. The distance between guide walls 45 is approximately the same as the width of leg 31 of L-shaped bracket 30. Thus, L-shaped bracket 30 slides into the space between guide walls 45 and is at least partially held in place by the lips 46 which act to embrace it.

L-shaped bracket 30 is further secured to sliding bracket 40 by means of a wind screw 50 and nut 55 (FIGS. 4 & 5). Leg 31 includes three vertically spaced apertures 33. Panel 43 includes a similar aperture 47 near the top thereof. By aligning one of the apertures 33 with aperture 47, one can pass wing screw 50 through the aligned apertures and into nut 55 on the other side thereof.

Leg 30 is provided with three apertures 33 so that one of three different heights can be selected for the location of the desired traverse rod screw holes with respect to the top of casement window 4. The use of regularly spaced adjustment apertures 33 is preferable to the provision of infinitely adjustable casement bracket since they provide an indexing means for positively locating the height of rule 10 with respect to each foot 32 of the two casement brackets 20.

Wing screw 50 includes a large head 51 which facilitates turning screw 50 with the thumb and forefinger. Nut 55 is generally U-shaped in cross section, having spaced legs 56 which embrace the outsides of guide walls 46 and which thereby prevent nut 55 from turning when screw 50 is turned (FIGS. 4 & 5). In connection with nut 56 it is important that spacer legs 44 be longer than the thickness of nut 56 in order to insure that nut 56 does not scrape against or interfere with rule 10 (FIG. 5).

Thus far, a rule 10 has been described having drill guide fixtures 13 only at the right end thereof as viewed from the front in FIG. 1. This allows rule 10 to be relatively short and thereby relatively manageable. If a pair of drill guide fixtures 13 were located at both ends, then the rule 10 would have to be sufficiently long that its ends extended beyond each side of casing 2. Otherwise, the drill guide fixtures 13 which project beyond the rear face of rule 10 (FIG. 2) would tend to mar the window casing and generally interfere with the location of rib 11 along the top edge of window casing 2. Accordingly, in order to drill holes at both sides of the window, it is necessary to use one rule 10 having drill guides 13 located at the right end and another rule 10 having drill guides 13 located at the left end.

Occasionally, a window casing 2 will be sufficiently narrow in width that it would be possible to use a single rule 10 having drill guide fixtures 13 located at each end without the rule 10 having to be exceptionally long and unwieldly. For such purposes, a rule 10a is provided having drill guide fixtures 13 located in its left end, and having a joining bracket 60 secured thereto to facilitate the releasable engagement, in endwise abutment, of rule 10 to rule 10a. Rule 10a is identical to rule 10, except that it includes joining bracket 60 rigidly secured thereto and has its drill guide fixtures 13 located at its left end.

Joining brackets 60 include an elongated channel shaped portion 61 (FIG. 7) having a bite portion 61a and a pair of spaced legs 61b (FIG. 8). Channel shaped portion 61 is rigidly secured to rule 10a by means of rivets or the like.

Channel shaped portion 61 is sufficiently long that it extends beyond the end of rule 10a and embraces rule 10 which is abutted against rule 10a in endwise fashion (FIGS. 6 & 7). Rigidly secured to and extending upwardly from one side of channel shaped member 61 is a generally vertical wall 62. Wall 62 extends upwardly and joins a top channel 67 (FIG. 8). Thus, that portion of channel shaped member 61 which extends beyond the end of rule 10a embraces the bottom edge of rule 10 while top channel 67 embraces the top edge of rule 10 (FIGS. 6 & 7). A hooked shaped portion 63 extends from the bottom of wall 62 and wraps around the bottom and opposite side of channel shaped member 61 to insure proper securance of wall 62 to channel member 61.

Wall 62 does include a generally C-shaped deviation therein defined by a bottom leg 64, back 65, and top leg 66 (FIG. 8). Top leg 66 is longer than bottom leg 64 by a distance approximately equal to the thickness of a leg 61b of channel shaped member 61 in order to insure a proper vertical alignment of top channel 67 with channel shaped member 61. This generally C-shaped deviation is included in wall 62 in order to accommodate the heads of rivets 14 whereby rib 11 is secured to rule 10 (FIG. 2). Thus, the heads of rivets 14 will slide past wall 62 and will not prevent rule 10 from being properly abutted against rule 10a. But, even if no rivets 14 were used, there would have to be a slight inward deviation in wall 62, corresponding to upper leg 66, which would properly locate channel 67 in vertical alignment with channel shaped member 61.

In operation, rule 10 can be used to locate screw holes at the right top side of window casing 2. Rib 11 is rested on the top of casing 2 and rule 10 is slid along until drill guides 13 are located a proper distance from the edge of casing 2, as determined by observing markings 12. The distance chosen will of course vary with different situations. With drill guides 13 properly located, a drill bit can be inserted therethrough and appropriate holes drilled into the wall. The drill guide 13 will help insure proper perpendicular alignment of the drill bit with the wall.

Rule 10a, having drill guides 13 located at its left end, can be used to locate screw holes at the left side of casement window 2. Both rule 10 and rule 10a are sufficiently short that they can be easily managed. Both have drill guides 13 only at one end, in order to avoid marring the casing 2 of the window.

If the window is sufficiently narrow, rule 10 and rule 10a can be joined together in endwise abutment by sliding rule 10 into joining bracket 60. First the holes on one side can be located and drilled and then the joined template can be slid along as necessary in order to properly locate screw holes at the opposite side of the window.

In the event that traverse rods must be installed above a casement window, casement brackets 20 can be releasably secured to rule 10. The sliding portion 40 of each casement bracket 20 can be slid over the end of rule 10. Generally L-shaped portion 30 can then be secured to sliding portion 40 to provide a downwardly depending leg 31 and inwardly projecting foot 32 which abuts the top inside surface of casement 4.

Casement bracket 20 can also be used to provide a means for varying the elevation of the screw holes with respect to the window. Any one of the apertures 33 can be aligned with the aperture 47 in sliding bracket 40 and can be held in that position by passing screw 50 therethrough. In this connection, casement brackets 20 can be used even in conjunction with windows having casing where a different elevation for the screw holes is desired from that which is normally used and which can be achieved by resting rib 11 on the top of the window casing.

Of course, it is understood that the above is merely a preferred embodiment of the invention and that many changes and alterations can be made thereof without departing from its spirit and broader aspects.

The embodiments of the invention in which an exclusive property or privilege is claimed are defined as follows.

1. A template, for use in hanging draperies, comprising: a rule, a linear rib projecting rearwardly from the rear of said rule whereby said rule can be hung on a window casing; regularly spaced markings along the length of said rule, visible on the front face thereof, whereby the distance of one end of said rule from the vertical edge of a window casing can be determined; at least two, vertically spaced locating apertures through said rule near said one end thereof through which holes can be drilled into a wall at the side of a window casing; a pair of generally L-shaped brackets releasably secured to said rule, spaced from one another along the length thereof, to facilitate use of said template on casement windows; each of said brackets including a leg extending downwardly from said rule and a foot, projecting inwardly from said leg for abutment with the upper inside surface of a casement window.

2. The template of claim 1 in which means are provided for varying the distance which said leg extends downwardly past the bottom of said rule; said distance varying means including means indexing the position of said bracket on said rule whereby the variation of said distance is limited to variation in fixed predetermined increments.

3. The template of claim 1 which includes means for varying the position of each of said brackets along the length of said rule, whereby said rule can be adjusted for use on casement windows of varying sizes.

4. The template of claim 1 in which said generally L-shaped brackets are releasably secured to said rule by being secured to a sliding bracket, slidably mounted on said rule; said sliding bracket having a first channel in the top thereof for embracing the top edge of said rule and a second channel at the bottom thereof for embracing the bottom edge of said rule; said sliding bracket having a face panel joined to each said channels; said face panel having guide walls at either side thereof and extending generally the height thereof; said leg of said generally L-shaped bracket being approximately as wide as the distance between said guide walls; means for holding said generally L-shaped bracket in position between said guide walls.

5. The template of claim 4 in which said panel of said sliding bracket includes at least one aperture therein; said leg of said generally L-shaped bracket including a plurality of spaced, vertically aligned holes therein; means for releasable insertion through one of said apertures in said leg and through said aperture in said panel whereby said generally L-shaped bracket and said sliding bracket are held in alignment.

6. The template of claim 5 in which said panel of said sliding bracket is spaced from said channels by a pair of spacer legs, one joining said panel to said top channel and the other joining said panel to said bottom channel; said insertion means comprising a wing screw threaded into a nut on the back side of said channel, said nut being thinner than the length of said spacer legs whereby it does not interfere with said rule; means being provided for holding said nut against rotation with respect to said sliding bracket.

7. The template of claim 4 in which said guide walls are bent inwardly toward one another, at a point spaced from said panel, whereby they define lips for embracing said leg of said generally L-shaped bracket.

8. A template, for use in hanging draperies, comprising: a pair of flat, elongated rules, each having a linear rib projecting from the rear thereof whereby each of said rules can be hung on a window casing; regularly spaced markings on each of said rules spaced along the length thereof and visible on the front face thereof, whereby the distance of one end of each rule from a vertical edge of a window casing can be determined; at least two vertically spaced locating apertures through each of said rules, near the right end of one of said rules and near the left end of the other of said rules, through which screw holes can be drilled into a wall at the side of a window casing; a joining bracket releasably holding both of said rules in endwise abutment with one another at their ends opposite those having said locating apertures thereat; a channel-shaped member embracing the front and rear surfaces of one of said rules and being rigidly secured to said one of said rules; said channel-shaped member extending beyond the end of said one rule and releasably embracing the other of said rules; a wall extending upwardly from one side of said channel-shaped member, at a point where it embraces said other of said rules, and joining a second channel which embraces the top edge of said other of said rules to thereby firmly hold said other of said rules in fixed alignment with said rule to which said channel-shaped member is rigidly secured.

9. The template of claim 8 in which said ribs are secured to said rules by means of rivets extending through said ribs and said holes; said wall extending upwardly from said channel shaped member having a deformation therein, out away from said rule, upwardly, and then back towards said rule, whereby the heads of rivets in said rule can slide past said wall.

10. The template of claim 8 in which said wall is secured to the outer face of one side of said channel shaped member; said wall including a deviation inwardly towards said rule, a distance approximately equal to the thickness of said side of said channel shaped member, whereby said second channel is in vertical alignment with said channel shaped member.

11. A template, for use in hanging draperies, said template comprising: an elongated, flat rule; first positioning means projecting rearwardly from the rear of said rule, said first positioning means being adapted for engaging a window casing whereby said rule can be hung on a window casing; regularly spaced markings along the length of said rule, visible on the front face thereof, whereby the distance of one end of said rule from the vertical edge of a window casing can be determined; locating means on said rule near said one end thereof for locating the points at which holes should be drilled into a wall at the side of a window to serve as screw holes for a drapery rod; securing means for releasably securing second positioning means to said rule; second positioning means releasably secured to said rule, said second positioning means being adapted for engaging the upper inside surface of a casement window whereby said template can be positioned and be used either on windows having a casing or on casement windows.

12. The template of claim 11 in which said locating means comprise at least two vertically spaced apertures through said rule through which a drill bit can be passed for drilling holes in a wall.

* * * * *